United States Patent [19]

Hanson

[11] 4,277,254
[45] Jul. 7, 1981

[54] CONTROL SYSTEM AND APPARATUS FOR PRODUCING COMPATIBLE MIXTURES OF FUEL GASES

[75] Inventor: Robert C. Hanson, Excelsior, Minn.

[73] Assignee: Energy Systems, Incorporated, Eden Prairie, Minn.

[21] Appl. No.: 121,796

[22] Filed: Feb. 15, 1980

[51] Int. Cl.[3] .......................... F17D 3/01; C10K 3/06
[52] U.S. Cl. ............................ 48/180 R; 48/180 C;
  48/180 P; 48/190; 48/191; 48/196 R;
  137/101.19
[58] Field of Search ............. 48/180 R, 180 C, 180 P,
  48/190, 191, 196 R; 137/91, 101.19; 431/12

[56] References Cited
U.S. PATENT DOCUMENTS

| | | | |
|---|---|---|---|
| 2,193,240 | 3/1940 | Schmidt | 48/190 |
| 2,719,080 | 9/1955 | Schmidt et al. | 48/190 |
| 3,119,672 | 1/1964 | Pierce | 48/190 |
| 3,206,394 | 9/1965 | Kleiss et al. | 48/196 R |
| 3,383,190 | 5/1968 | Weber et al. | 44/2 |
| 3,419,369 | 12/1968 | Kelley | 48/196 R |
| 3,433,606 | 3/1969 | Moore et al. | 44/2 |
| 3,491,585 | 1/1970 | Hass | 73/53 |
| 3,503,722 | 3/1970 | Weber et al. | 44/2 |
| 3,582,281 | 6/1971 | Fenske et al. | 23/230 |
| 3,999,959 | 12/1976 | Bojek | 44/2 |

Primary Examiner—Peter F. Kratz
Attorney, Agent, or Firm—Kinney, Lange, Braddock, Westman and Fairbairn

[57] ABSTRACT

In a fuel gas distribution system, at least one fuel gas stream is mixed with air to achieve a heating value equivalency which is the same as that of another fuel gas having a different heating value and specific gravity. The heating value equivalency is defined as the heating value of a fuel gas in heat units per unit of volume divided by the square root of the specific gravity of the gas. A control system is employed to measure the specific gravity, pressure, temperature and flow rate of the first gas in a first gas stream, and the pressure, temperature and flow rate of air in a second stream, and to control the flow rate of the gas from the first stream and air from the second stream such that the resulting mixture from the two streams has the same heating value equivalency as that of a third gas which was used to adjust the gas burners for use in that system.

3 Claims, 1 Drawing Figure

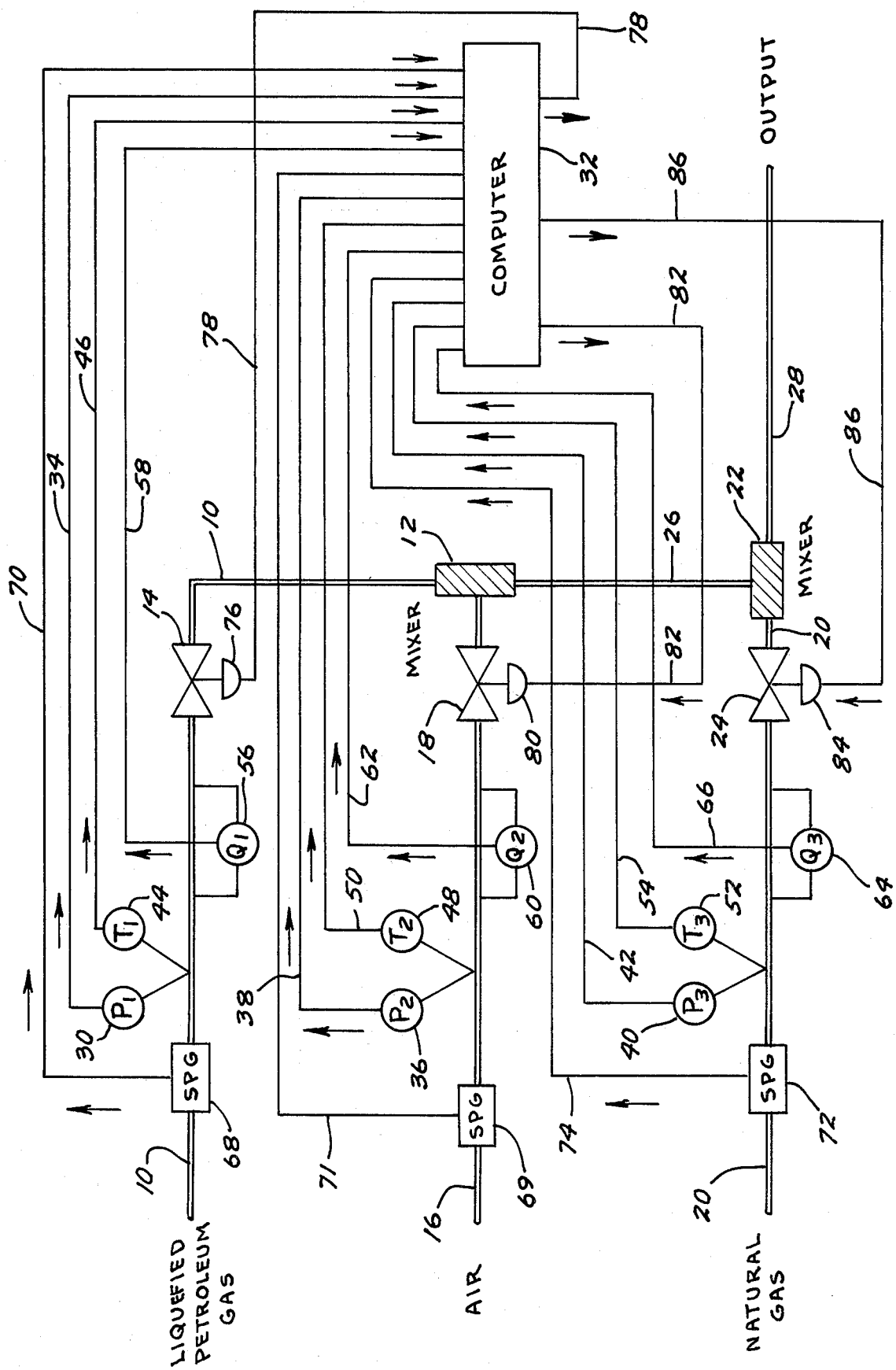

CONTROL SYSTEM AND APPARATUS FOR PRODUCING COMPATIBLE MIXTURES OF FUEL GASES

BACKGROUND OF THE INVENTION

This invention has relation to apparatus and methods for mixing different fuel gases with themselves and/or with air to produce fuel gas mixtures which will have uniform and efficient burning characteristics in gas appliances without any change in adjustment of the burners on those appliances. Among the factors which affect the satisfactory interchangeability of fuel gases are the flame characteristics of different gases and mixtures of gases. These characteristics include the tendencies for lifting, yellow tipping, and flashback. It has been discovered that if a heating value equivalency in the various mixtures of gases fed to gas appliances can be maintained relatively close to the heating value equivalency of a gas on which initial adjustment of the gas burners has been made, satisfactory results can be obtained without the necessity of readjusting the burners as other changes occur in the make-up of the gas mixtures fed to the appliances.

Such a heating value equivalency can be defined as the heating value of a gas in heat units per unit of volume divided by the square root of the specific gravity of the gas. Initially in the British practice, this was called the Wobbe Index or the Wobbe Number. The heating values of various gases can be determined from the specific gravity of those gases so a measurement of the specific gravity of a particular gas mixture allows the heating value of that mixture to be calculated.

It is known to calculate the Wobbe Number or heating value equivalency for natural gas, for example, under conditions of standard pressure and temperature; and then to calculate the ratio of a liquid petroleum gas such as propane to be mixed with air at standard pressure and temperature in order to achieve a mixture having substantially the same heating value equivalency or Wobbe Index as that of the natural gas.

Then, taking into consideration an assumed propane temperature and air temperature and an assumed pressure in the propane and air lines, it is possible to calculate the flow rate needed in each of those lines to achieve the heating value equivalency or Wobbe Index of natural gas in the resulting propane/air mixture. By accurately controlling such a flow rate and by accurately maintaining the temperatures and pressures at the assumed values, and assuming the specific gravity of the propane to be uniform and unchanging, a propane/air mixture having the same heating value equivalency as that of the natural gas can be produced.

In a dynamic system, however, the demand for effluent or output gas changes, the supply of propane and/or natural gas varies causing pressure changes in the supply lines, and the ambient or input temperature of each gas and of the input air changes. Also, where off gases from other processes are to be combined with other fuel gases, the specific gravity and heating value is a variable. As each of these factors changes, new calculations are needed to determine the flow rates and the ratio of flow rates of fuel gases and/or air needed to continue to achieve in the fuel gas output mixture the heating value equivalency or Wobbe Index of the natural gas or other gas for which the burners of the gas appliances were initially adjusted. After and as these calculations are made, instantaneous and continuously changing adjustments of the flow rates would have to be achieved. This was not possible prior to the present invention.

Therefore, a control system was needed to automatically take into account these changes in make-up of the gases to be mixed, changes in demand, in input pressures, and variations in specific gravity and temperature. The apparatus and control system of the present invention was developed to meet that need.

A preliminary search was made on this invention, and the following patents were identified:

- U.S. Pat. No. 3,383,190 to Weber et al, granted in May of 1968;
- U.S. Pat. No. 3,433,606 to Moore et al, granted in March of 1969;
- U.S. Pat. No. 3,491,585 to Hass, granted in January of 1970;
- U.S. Pat. No. 3,503,722 to Weber et al, granted in March of 1970;
- U.S. Pat. No. 3,582,281 to Fenske et al, granted in June of 1971; and
- U.S. Pat. No. 3,999,959 to Bajek, granted in December of 1976.

These patents are merely illustrative of the type of subject matter which is patentable and are not believed to be particularly pertinent to the present invention. Applicant and those in privity with him know of no closer prior art than that set out or discussed above; and they know of no prior art which anticipates the claims made in this application.

BRIEF SUMMARY OF THE INVENTION

In the apparatus of the present invention, one or more fuel gases and/or air are each fed to mixing means through separate supply lines, each controlled by a flow-varying means or control valve. Measurements can be made of the pressure, temperature, flow volume and specific gravity of each of the fuel gases and of the pressure, temperature and flow volume of the air. Signals representative of each of these values are fed signal computing means where signals are developed to control signal-receiving means which in turn control the flow-varying means to cause the heating value equivalency of the mixture of fuel gases and air to equal the heating value equivalency of the fuel gas used in initially adjusting the gas burners of the gas appliances in which the fuel gas mixture is to be used.

IN THE DRAWING

There is shown a schematic view of an apparatus for mixing a first fuel gas with air or second fuel gas, and for mixing the resulting mixture with a third fuel gas so that the resulting three gas mixture will have a heating value equivalency equal to that of the third fuel gas; thereby providing an effluent which will perform in gas burners in a manner similar to that of the third gas alone.

DESCRIPTION OF PREFERRED EMBODIMENTS

A first fuel gas delivery line 10 delivers a fuel gas such as liquefied petroleum gas under pressure from a source (not shown) to a gas mixture 12 through a first flow-varying means or control valve 14. A second air or fuel gas delivery line 16 delivers air or a second fuel gas under pressure from a source (not shown) to the gas mixer 12 through a second flow-varying means or control valve 18.

A third fuel gas delivery line 20 delivers a third fuel gas such as natural gas under pressure from a source (not shown) to an output mixer 22 through a third flow-varying means or control valve 24 in the form of the invention as shown. A gas delivery line 26 delivers the mixed first and second gases from the mixer 12 to the output mixer 22, while a final product effluent or output delivery line 28 delivers the final fuel gas mixture from output mixer 22 to a location for use of that final mixture (not shown).

A first pressure sensing means 30 is open to first fuel gas delivery line 10 and develops a first signal representative of the pressure in the first delivery line. This signal is delivered to a computer 32 through a first input signal delivery line 34. A second pressure sensing means 36 generates a signal which is representative of the pressure in second fuel gas or air delivery line 16, which signal is transmitted to the computer 32 through second input delivery line 38. A third pressure sensing means 40 is open to third fuel gas delivery line 20 and develops a third signal representative of the pressure in the third fuel gas delivery line 20, which signal is transmitted to the computer 32 through a third input signal delivery line 42.

A first temperature sensing means 44 is open to first fuel gas delivery line 10 and develops a signal representative of the temperature of the gas in that line, which signal is delivered to the computer through a fourth input signal delivery line 46. A second temperature sensing means 48 is open to the second delivery line 16 and develops a signal representative of the temperature of the gas in that line, which signal is fed to the computer through a fifth input signal delivery line 50. A third temperature sensing means 52 is open to the third fuel gas delivery line 20 and develops a signal representative of the temperature of the gas in that line, which signal is fed to the computer through a sixth input signal delivery line 54.

A first fluid flow sensing means 56 is associated with the first fuel gas delivery line 10 and develops a signal representative of the rate of flow of gas in that line, which signal is fed to the computer through seventh input signal delivery line 58. A second fluid flow sensing means 60 is associated with delivery line 16 and develops a signal representative of the flow of gas in that line, which signal is fed to the computer through an eighth input signal delivery line 62. A third fluid flow sensing means 64 is associated with the third fuel gas delivery line 20, and develops a signal which is representative of the flow of gas in that line, which signal is fed to the computer 32 through ninth input signal delivery line 66.

A first specific gravity sensing means 68 is associated with the first fuel gas delivery line 10, and develops a signal which is representative of the specific gravity of the gas in delivery line 10, which signal is fed to the computer 32 through a tenth input signal delivery line 70. A second specific gravity sensing means 69 is associated with the second fuel gas or air delivery line 16 and develops a signal representative of the specific gravity of the gas in line 16, which signal is fed to the computer through eleventh input signal delivery line 71. Of course, when the second gas is air, no specific gravity sensing means is needed and no signal need be fed through the eleventh input signal delivery line because the specific gravity of air is known to be and is defined as unity or 1.0.

A third specific gravity sensing means 72 is associated with third fuel gas delivery line 20 and develops a signal representative of the specific gravity of the gas in the line 20, which signal is fed to the computer through a twelfth input signal delivery line 74.

A first valve operator and signal-receiving means 76 is operably associated with the first flow-varying means or control valve 14.

A second valve operator and signal-receiving means 80 is operably associated with the second flow-varying means or control valve 18. A third valve operator and signal receiving means 84 is operably associated with the third flow-varying means and control valve 24.

The heating value of a fuel gas can be determined by its specific gravity according to Document AGA5 of the American Gas Association. For example, according to the AGA5 formula, the heating value of a liquefied petroleum in BTU's per cubic foot is 1550.815 times its specific gravity plus 167.24. Thus the signal developed by the first specific gravity sensing means 68 and fed to the computer on tenth input signal delivery line 70 can be used by the computer to determine the heating value of the first gas. Similarly, the heating value of the third fuel gas can be determined as well as that of the second gas when that is not air.

EXAMPLE A

Assume a situation where end use fuel burners have been adjusted to perform most efficiently and effectively using a third fuel gas such as natural gas for example, and it is desirable to augment an available supply of this third gas under pressure with a first gas such as propane, for example, and air or a second gas such as an off gas from an industrial process for example, to keep the output pressure of the resulting effluent constant even when load demands exceed the available supply of the third gas.

In that situation, using the third fuel gas heating value and signals from the third, sixth, ninth and twelfth input signal delivery lines, a first computing means within the computer develops a signal representative of the heating value equivalency of the third fuel gas in the third fuel gas delivery line 20.

Using the first fuel gas heating value (and the second fuel gas heating value if the second gas is not air) and using signals from the first, second, fourth, fifth, seventh, eighth and tenth (and eleventh where applicable) input signal delivery lines, a second computing means within the computer develops a signal representative of the heating value equivalency of the mixture leaving the mixer 12.

Other signals can be fed to the computer such as signals representative of such factors as: the cost of each of the fuel gases; the flow volume of the gas mixture leaving the output mixer 22; the pressure, temperature and specific gravity of the gas mixture leaving the output mixer; a requirement to maintain the flow volume of one of the fuel gases at a maximum or in fixed relation to the flow volume of the other of the fuel gases; a requirement to keep the cost of the final output mixture at a minimum; a requirement to limit the maximum percentage of one constituent, say hydrogen for example, in the effluent; or a requirement to keep the output flow volume at a maximum or at a fixed pressure.

Comparative means within the computer compares the signal representative of the heating value equivalency of the third fuel gas in the third fuel gas delivery line and the heating value equivalency of the mixture leaving the gas mixer 12, and taking into account the other instructions and signals fed to the computer if any, develops an output signal which is fed through a first output delivery line 78 to the first signal receiving means 76 to thereby operably control the position of the first flow-varying means 14, and an output signal which is delivered through a second output signal delivery line 82 to the second signal-receiving means 80 to thereby operably control the positioning of the second flow-varying means 18 to the end that the heating value equivalency of the output from the mixer 12 is the same as that from the third fuel gas delivery line 20. Assuming all of the available supply of the third fuel gas was to be utilized, any signal on third output delivery line 86 would not call for any closing or throttling of third flow-varying means or control valve 24 and that valve would be completely open.

EXAMPLE B

It is evident that the heating value equivalency of the third fuel gas, if the proportion of its constituents do not vary, is a constant. The heating value equivalency or Wobbe Number or Wobbe Index of natural gas, for example, is often calculated to be 1270. Where a gas burning system has been properly adjusted to function on a fuel gas such as natural gas having a heating value equivalency of 1270, for example, other fuel gases and/or air can be mixed to have the same heating value equivalency of 1270.

Assume that a first fuel gas, in first gas delivery line 10, air in second delivery line 16, and a third gas in a third gas delivery line 20 are to be mixed to burn in a gas utilizing system which has been adjusted to use a gas having a heating value equivalency of 1270, for example.

Using heating values of the first and third gases and using the signals from the first, second, third, fourth, fifth, sixth, seventh, eighth, ninth, tenth, and twelfth input signal delivery lines, a first computing means within the computer develops a signal representative of the heating value equivalency of the effluent leaving the output mixer 22.

Comparative means within the computer compares this effluent heating value equivalency with 1270, for example, and taking into account other instructions if any, develops output signals fed through the first, second and third output signal delivery lines 78, 82 and 86 to cause first, second, and third value operator means 76, 80 and 84 control the first, second and third flow-varying means or control valves 14, 18 and 24, respectively, to the end that the heating value equivalency of the mixture in final product delivery line 28 approaches 1270.

The drawing discloses such elements as pressure sensing means 30, temperature sensing means 44, and specific gravity sensing means 68. In particular situations, on particular gas lines, as where pressure or temperature is kept constant or where the specific gravity of a gas is known and does not vary, one or more of these sensing means can be eliminated or just not used. In such cases, the means for developing a signal representative of that known and constant function will be a manual or other appropriate means for developing and transmitting such constant signal to the appropriate computing means.

While two fuel gases and air are disclosed in the exemplary embodiment of the invention herein; apparatus according to the present invention could handle more incoming gas lines, or could be utilized to blend a fuel gas having one heating value equivalency with air to achieve a predetermined different heating value equivalency, without departing from the spirit of the invention and the scope of the claims which follow.

The embodiments of the invention in which an exclusive property or privilege is claimed are defined as follows:

1. An apparatus for mixing at least one stream of fuel gas under pressure in a first conduit with another stream of gas under pressure in a second conduit to create a resulting fuel gas mixture under pressure in a third conduit connected to said first and second conduits, said resulting mixture having a particular desired heating value equivalency, wherein said heating value equivalency is defined as the heating value of a gas divided by the square root of the specific gravity of that gas and where said heating value can be expressed as a function of the specifc gravity plus a constant; said apparatus including a control system comprising, in combination:
   A. a first flow-varying means operatively connected to said first conduit for controlling the flow of gas through said first conduit;
   B. a second flow-varying means operatively connected to said second conduit for controlling the flow of gas through said second conduit;
   C. pressure sensing means operatively connected to said first conduit for developing a first signal representative of the pressure in said first conduit upstream of said first flow-varying means;
   D. pressure sensing means operatively connected to said second conduit for developing a second signal representative of the pressure in said second conduit upstream of said second flow-varying means;
   E. temperature sensing means operatively connected to said first conduit for developing a third signal representative of the temperature in said first conduit upstream of said first flow-varying means;
   F. temperature sensing means operatively connected to said second conduit for developing a fourth signal representative of the temperature in said second conduit upstream of said second flow-varying means;
   G. first fluid flow sensing means operatively connected to said first conduit for developing a fifth signal representative of the rate of flow of gas through said first conduit;
   H. second fluid flow sensing means operatively connected to said second conduit for developing a sixth signal representative of the rate of flow of gas through said second conduit;
   I. specific gravity sensing means operatively connected to said first conduit for developing a seventh signal representative of the specific gravity of the gas in said first conduit;
   J. specific gravity sensing means operatively connected to said second conduit for developing an eighth signal representative of the specific gravity of the gas in said second conduit;
   K. first signal computing means for developing a ninth signal representative of a particular desired heating value equivalency;
   L. second signal computing means operatively connected for receiving said first, second, third, fourth, fifth, sixth, seventh and eighth signals, said second signal computing means developing a tenth signal representative of the heating value equivalency of the fuel gas mixture flowing in said third conduit;

M. comparator means, operatively connected for receiving said ninth and tenth signals, which compares the particular desired heating value equivalency represented by said ninth signal with the heating value equivalency of the gas flowing in said third conduit as represented by said tenth signal and generates first and second output signals; and N. a first signal receiving means operatively connected to said comparator means to which said first output signal is transmitted from said comparator means and a second signal receiving means operatively connected to said comparator means to which said second output signal is transmitted from said comparator means, said first signal receiving means connected to said first flow varying means for controlling said first flow-varying means and said second signal receiving means connected to said second flow varying means for controlling said second flow-varying means, whereby gas flow in said first and second conduits is varied to maintain the tenth signal equal to the ninth signal.

2. An apparatus for mixing at least one stream of fuel gas under pressure in a first conduit with another stream of gas under pressure in a second conduit and a third stream of fuel gas under pressure in a third conduit to create a resulting fuel gas mixture under pressure in a fourth conduit which is open to the first, second, and third conduits, said resulting mixture having a heating value equivalency equal to that of the heating value equivalency of the third gas stream in the third conduit, wherein said heating value equivalency is defined as the heating value of a gas divided by the square root of the specific gravity of that gas and where said heating value can be expressed as a function of the specfic gravity plus a constant; said apparatus including a control system comprising, in combination:

A. a first flow-varying means operatively connected to said first conduit for controlling the flow of gas through said first conduit;

B. a second flow-varying means operatively connected to said second conduit for controlling the flow of gas through said second conduit;

C. pressure sensing means operatively connected to said first conduit for developing a first signal representative of the pressure in said first conduit upstream of said first flow-varying means;

D. pressure sensing means operatively connected to said second conduit for developing a second signal representative of the pressure in said second conduit upstream of said second flow-varying means;

E. pressure sensing means operatively connected to said third conduit for developing a third signal representative of the pressure in said third conduit;

F. temperature sensing means operatively connected to said first conduit for developing a fourth signal representative of the temperature of said first conduit of upstream of said first flow-varying means;

G. temperature sensing means operatively connected to said second conduit for developing a fifth signal representative of the temperature in said second conduit upstream of said second flow-varying means;

H. temperature sensing means operatively connected to said third conduit for developing a sixth signal representative of the temperature in said third conduit;

I. first fluid flow sensing means operatively connected to said first conduit for developing a seventh signal representative of the rate of flow of gas through said first conduit;

J. second fluid flow sensing means operatively connected to said second conduit for developing an eighth signal representative of the rate of flow of gas through said second conduit;

K. third fluid flow sensing means operatively connected to said third conduit for developing a ninth signal representative of the rate of flow of gas through said third conduit;

L. specific gravity sensing means operatively connected to said first conduit for developing a tenth signal representative of the specific gravity of the gas in said first conduit;

M. specific gravity sensing means operatively connected to said third conduit for developing an eleventh signal representative of the specific gravity of the gas in said second conduit;

N. specific gravity sensing means operatively connected to said third conduit for developing a twelfth signal representative of the specific gravity of the gas in said third conduit;

O. first signal computing means operatively connected for receiving said third, sixth, ninth, and twelfth signals, said first signal computing means developing a ninth signal representative of the heating value equivalency of the fuel gas mixture flowing through said third conduit;

P. second signal computing means operatively connected for receiving said first, second, third, fourth, fifth, sixth, seventh, eighth, ninth, tenth, eleventh and twelfth signals, said second signal computing means developing a tenth signal representative of the heating value equivalency of the fuel gas mixture flowing in the fourth conduit;

Q. comparator means, operatively connected for receiving said ninth and tenth signals, which compares the heating value equivalency of the gas flowing in the third conduit as represented by said ninth signal with the heating value equivalency of the gas flowing in said fourth conduit as represented by said tenth signal and generates first and second output signals; and R. a first signal receiving means operatively connected to said comparator means to which said first output signal is transmitted from said comparator means and a second signal receiving means operatively connected to said comparator means to which said second output signal is transmitted from said comparator means, said first signal receiving means connected to said first flow varying means for controlling said first flow-varying means and said second signal receiving means connected to said second flow varying means for controlling said second flow-varying means, whereby gas flow in said first and second conduits is varied to maintain the tenth signal equal to the ninth signal.

3. An apparatus for mixing at least one stream of fuel gas under pressure in a first conduit with another stream of gas under pressure in a second conduit and a third stream of fuel gas under pressure in a third conduit to create a resulting fuel gas mixture under pressure in a fourth conduit which is open to the first, second and the third conduits, said resulting mixture having a heating value equivalency equal to that of the heating value equivalency of the third gas stream in the third conduit, wherein said heating value equivalency is defined as the heating value of a gas divided by the square root of the specific gravity of that gas and where said heating value can be expressed as a function of the specific gravity plus a constant; said apparatus including a control system comprising, in combination:

A. a first flow-varying means operatively connected to said first conduit for controlling the flow of gas through said first conduit;
B. a second flow-varying means operatively connected to said second conduit for controlling the flow of gas through said second conduit;
C. a third flow-varying means operatively connected to said third conduit for controlling the flow of gas through said third conduit;
D. pressure sensing means operatively connected to said first conduit for developing a first signal representative of the pressure in said first conduit upstream of said first flow-varying means;
E. pressure sensing means operatively connected to said second conduit for developing a second signal representative of the pressure in said second conduit upstream of said second flow-varying means;
F. pressure sensing means operatively connected to said third conduit for developing a third signal representative of the pressure in said third conduit upstream of said third flow-varying means;
G. temperature sensing means operatively connected to said first conduit for developing a fourth signal representative of the temperature in said first conduit upstream of said first flow-varying means;
H. temperature sensing means operatively connected to said second conduit for developing a fifth signal representative of the temperature in said second conduit upstream of said second flow-varying means;
I. temperature sensing means operatively connected to said third conduit for developing a sixth signal representative of the temperature in said third conduit;
J. first fluid flow sensing means operatively connected to said first conduit for developing a seventh signal representative of the rate of flow of gas through said first conduit;
K. second fluid flow sensing means operatively connected to said second conduit for developing an eighth signal representative of the rate of flow of gas through said second conduit;
L. third fluid flow sensing means operatively connected to said third conduit for developing a ninth signal representative of the rate of flow of gas through said third conduit;
M. specific gravity sensing means operatively connected to said first conduit for developing a tenth signal representative of the specific gravity of the gas in said first conduit;
N. specific gravity sensing means operatively connected to said second conduit for developing an eleventh signal representative of the specific gravity of the gas in said second conduit;
O. specific gravity sensing means operatively connected to said third conduit for developing a twelfth signal representative of the specific gravity of the gas in said third conduit;
P. first signal computing means operatively connected for receiving said third, sixth, ninth, and twelfth signals, said first signal computing means developing a ninth signal representative of the heating value equivalency of the fuel gas mixture flowing through said third conduit;
Q. second signal computing means operatively connected for receiving said first, second, third, fourth, fifth, sixth, seventh, eighth, ninth, tenth, eleventh and twelfth signals, are second signal computing means developing a tenth signal representative of the heating value equivalency of the fuel gas mixture flowing in the fourth conduit;
R. comparator means operatively connected for receiving said ninth and tenth signals, which compares the heating value equivalency of the gas flowing in the third conduit as represented by said ninth signal with the heating value equivalency of the gas flowing in said fourth conduit as represented by said tenth signal and generates first, second and third output signals; and
S. a first signal receiving means operatively connected to said comparator means to which said first output signal is transmitted from said comparator means, a second signal receiving means operatively connected to said comparator means to which said second output signal is transmitted from said comparator means and a third signal receiving means operatively connected to said comparator means to which said third output signal is transmitted from said comparator means, said first signal receiving means connected to said first flow-varying means for controlling said first flow-varying means, said second signal receiving means connected to said second flow-varying means for controlling said second flow-varying means and said third signal receiving means connected to said third flow-varying means for controlling said third flow-varying means, whereby the gas flow in said first, second and third conduits is varied to maintain the tenth signal equal to the ninth signal.

* * * * *